United States Patent Office 3,232,736
Patented Feb. 1, 1966

3,232,736
HERBICIDAL USE OF N-BENZOYLANTHRANILIC ACID AND 6-OXO-2-PHENYL-4,5-BENZO-1,3-OXAZINE
Matthias Seefelder, Ludwigshafen (Rhine), and Adolf Fischer, Mutterstadt, Pfalz, Germany, assignors to Badische Anilin- & Soda-Fabrik Aktiengesellschaft, Ludwigshafen (Rhine), Germany
No Drawing. Filed Aug. 27, 1963, Ser. No. 304,954
Claims priority, application Germany, Sept. 27, 1962, B 68,994
2 Claims. (Cl. 71—2.5)

This invention relates to herbicides which contain N-benzoylanthranilic acid or the anhydro compound thereof.

It is an object of the present invention to provide herbicides which have selective activity and which control unwanted plant growth without being harmful to the crop plants.

We have found that benzoylanthranilic acid and particularly the anhydro compound thereof having the formula

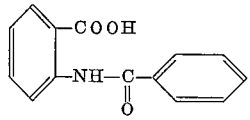

or

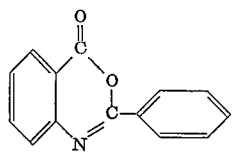

are capable of affecting plant growth.

The anhydro compound is a 6-oxo-2-phenyl-4,5-benzo-1,3-oxazine. Agents according to this invention which contain one of the said compounds as active substance are contact herbicides which have a selective herbicidal action in crops, particularly when used in post-emergence methods. They are particularly valuable by reason of the rapid commencement of action and the fact that they have no after-effects.

The agents according to this invention are advantageously used in admixture with solid or liquid carrier substances with the addition of emulsifiers, dispersing agents or wetting agents in the conventional way for plant protecting agents. Examples of suitable liquid carriers are water, mineral oil fractions, diesel oils, coal tar oils, cyclic hydrocarbons, and solvents, for example alcohols, ketones, aliphatic hydrocarbons or chlorinated hydrocarbons. Examples of suitable solid carriers are chalk, bentonite, diatomaceous earth, bleaching earths, talc, calcium carbonate, boric acid, calcium phosphate, sawdust or cork powder.

The various forms of application may be better adapted to the various uses in the conventional way by adding substances which improve distribution, adhesion, resistance to rain and penetrating power, for example fatty acids, resins, wetting agents, emulsifying agents, glue or alginates. Similarly the biological activity spectrum may be broadened by adding substances having bactericidal, fungicidal or plant growth inhibiting properties, for example substituted phenoxycarboxylic acids, acid anilides, chlorinated fatty acid esters or trisubstituted ureas.

Improvement in the action of the agents is also achieved by adding borates, chlorates, thiocyanates, primary phosphates, methyl arsonates and cacodylic acid.

The following examples illustrate the use of agents according to this invention.

Example 1

2.5 kg. of anhydro-(N-benzoylanthranilic acid) suspended in 500 liters of water is sprayed on each 2 hectares of the following plants in a greenhouse: *Hordeum vulgare* (barley), *Avena sativa* (oats), *Triticum sativum* (wheat), *Secale cereale* (rye), *Sinapis alba* (mustard), *Urtica urens* (small nettle), *Matricaria chamomilla* (wild camomile) and *Galium aparine* (cleavers). The plants are about 5 cm. in height.

Two to three days later the plants begin to wither and die from the leaf tips. After six to ten days mustard, small nettle and camomile have almost completely withered and cleavers is severely damaged, whereas barley, oats, wheat and rye continue to grow without damage.

Benzoylanthranilic acid has a similar action to anhydro-(N-benzoylanthranilic acid).

Example 2

2.5 kg. of anhydro-(N-benzoylanthranilic acid) suspended in 500 liters of water is sprayed on the following plants per hectare in open land: *Zea mays* (maize), *Linecea usitatissimum* (flax), *Oryza sativa* (rice), *Sinapis alba* (mustard), *Urtica urens* (small nettle), *Matricaria chamomilla* (camomile), *Panicum crus galli* (cockspur panicum). The plants are about 5 cm. in height.

Two to three days later the plants begin to wither from the leaf tips and after ten to twelve days the flax, small nettle, camomile and cockspur panicum are almost completely withered, while maize and rice have not been damaged.

We claim:
1. A method of controlling unwanted plant growth by treating the soil with a phytotoxic amount of a compound selected from the group consisting of N-benzoylanthranilic acid and 6-oxo-2-phenyl-4,5-benzo-1,3-oxazine.
2. A method of controlling unwanted plant growth by treating the plant with a phytotoxic amount of a compound selected from the group consisting of N-benzoylanthranilic acid and 6-oxo-2-phenyl-4,5-benzo-1,3-oxazine.

No references cited.

LEWIS GOTTS, *Primary Examiner.*